US012617454B2

(12) United States Patent
     Eom et al.

(10) Patent No.:    US 12,617,454 B2
(45) Date of Patent:       May 5, 2026

(54) AGRICULTURAL TRACTOR

(71) Applicant: LS MTRON LTD., Anyang-si (KR)

(72) Inventors: Tae Ho Eom, Anyang-si (KR); Taek Seong Kim, Anyang-si (KR); Seung Tae Lee, Anyang-si (KR)

(73) Assignee: LS MTRON LTD., Anyang-si (KR)

( * ) Notice:     Subject to any disclaimer, the term of this patent is extended or adjusted under 35 U.S.C. 154(b) by 0 days.

(21) Appl. No.: 19/089,475

(22) Filed:     Mar. 25, 2025

(65)            Prior Publication Data

US 2025/0222978 A1     Jul. 10, 2025

Related U.S. Application Data

(63) Continuation     of     application     No. PCT/KR2023/013261, filed on Sep. 5, 2023.

(30)         Foreign Application Priority Data

Oct. 5, 2022     (KR) ........................ 10-2022-0127117
Sep. 1, 2023     (KR) ........................ 10-2023-0115966

(51) Int. Cl.
     *B62D 5/06*         (2006.01)
     *B62D 33/06*        (2006.01)
     *B62D 49/06*        (2006.01)
(52) U.S. Cl.
     CPC ......... *B62D 5/062* (2013.01); *B62D 33/0604* (2013.01); *B62D 49/0692* (2013.01)
(58) Field of Classification Search
     CPC .... B62D 33/06; B62D 5/062; B62D 33/0604; B62D 49/0692
     See application file for complete search history.

(56)            References Cited

U.S. PATENT DOCUMENTS 4,674,769  A  *  6/1987  Ota ........................ B62D 1/183
                                                     280/775
5,036,942  A  *  8/1991  Loewen ................... B62D 1/18
                                                     280/775
5,168,768  A  *  12/1992  Easton ................... B62D 1/184
                                                     74/535

FOREIGN PATENT DOCUMENTS

JP        2006205763  A        8/2006
JP        2013060153  A        4/2013
JP        2020189581  A   *   11/2020
KR        20090090510  A        8/2009
KR     2020120003608  U        5/2012
KR        20140141836  A       12/2014
KR        20220103399  A        7/2022

OTHER PUBLICATIONS

International Search Report for related International Application No. PCT/KR2023/013261; action dated Apr. 11, 2024; (2 pages).

(Continued)

*Primary Examiner* — Abiy Teka
(74) *Attorney, Agent, or Firm* — K&L Gates LLP

(57)            ABSTRACT

The present disclosure is directed to an agricultural tractor. In an agricultural tractor according to the present disclosure, a steering unit is coupled to a coupling target in a power supply room. According to the present disclosure, the efficiency of the assembly of a cabin and a transmission is maintained, and also vibration and noise are reduced in a boarding space.

11 Claims, 5 Drawing Sheets

(56) References Cited

OTHER PUBLICATIONS

Written Opinion for related International Application No. PCT/
KR2023/013261; action dated Apr. 11, 2024; (5 pages).
Office Action for related Japanese Application No. 2025-518027;
action dated Feb. 17, 2026; (9 pages).

* cited by examiner

AGRICULTURAL TRACTOR

CROSS-REFERENCE TO RELATED APPLICATION

This application is a Continuation Application of International Application No. PCT/KR2023/013261 filed on Sep. 5, 2023, which claims priority to and the benefit of Korean Patent Application No. 10-2022-0127117, filed on Oct. 5, 2022, and Korean Patent Application No. 10-2023-0115966, filed on Sep. 1, 2023, the disclosures of which are incorporated herein by reference in its entirety.

FIELD

The present disclosure relates to an agricultural tractor, and more particularly, to a steering structure.

BACKGROUND

Agricultural tractors are work machines (or vehicles) that are used for various purposes through the attachment and detachment of implements having different functions.

Agricultural tractors are moved forward and backward by the power generated by power generators (mainly internal combustion engines), like general automobiles, so that steering systems need to be installed to change the direction of movement.

Generally, such a steering system includes a handle, a steering unit, etc.

The steering unit is implemented to change the direction of steer wheels by converting the rotational force of the handle, manipulated by a driver, into linear movement force.

The main usage areas of agricultural tractors are workspaces, so that the contact surfaces between steer wheels and a ground surface are considerably uneven. This makes it difficult for a driver to manipulate the handle. Accordingly, the steering unit requires a mechanism that adds separate assistance force when the driver wants to turn the handle.

Unlike general automobiles, agricultural tractors mainly use hydraulic pressure as the assistance force. In this case, a hydraulic pump is operated to provide assistance force to the steering unit, so that a hydraulic line needs to be installed between the hydraulic pump and the steering unit.

Usually, the steering unit is disposed inside the boarding space of a cabin, and the hydraulic pump is disposed on an engine or transmission side. Furthermore, the hydraulic line connects the hydraulic pump and the steering unit in order to take charge of the movement of the working fluid from the hydraulic pump to the steering unit. However, this arrangement has some problems.

First, the vibration and noise of an engine and the hydraulic pump are directly transmitted to the driver in the boarding space of the cabin through the hydraulic line. Unlike airborne noise or the vibration and noise coming through a cabin frame, it is considerably difficult to reduce the vibration and noise coming through the hydraulic line.

Second, when the cabin is separated from or coupled to the transmission, separate hydraulic line disassembly or connection work needs to be performed. In this case, a work space is significantly narrow, making it difficult to disassemble or connect the hydraulic line.

For this reason, there have been various proposals to separate a steering unit from a driver. However, existing proposals have problems in that it is difficult to secure space and perform design, and increase the manufacturing cost by increasing the material cost. For reference, Korean Patent Application Publication No. 10-2009-0090510 (Title of the disclosure: Steering System for Tractor Cabin with Noise and Vibration Prevention Function) (hereinafter referred to as 'conventional art'), which is one of the existing proposals, is discussed below.

According to the conventional art, a steering unit (called a 'power steering unit' in the conventional art) is disposed under the cabin. Accordingly, the conventional art has the advantage of reducing noise and vibration coming to a driver through the hydraulic line. Nevertheless, the conventional art still has the following various difficulties.

First, there is provided a structure in which the transmission is generally disposed under the cabin and the cabin is coupled to the transmission. However, in order to apply the conventional art, the design of the location and structure of the transmission needs to be changed somewhat as the steering unit is disposed under the cabin. Furthermore, there is a need for a change in the design of a power transmission structure between an engine and the transmission. Moreover, these changes significantly increase the initial cost in terms of the new design of a power transmission structure and the verification of stability.

Second, the steering unit in the conventional art is directly coupled to the bottom plate of the cabin, so that the cabin may not be completely free from the vibration and noise coming from the steering unit. It is obvious that the conventional art attempts to minimize vibration and noise by spacing the cabin and the steering unit apart from each other and disposing a buffer material. However, even with this structure, two problems are still not overcome.

One of them is that the buffer material also functions to some extent as a medium for transmitting vibration and noise, so that there is a limitation to the reduction of vibration and noise within that limit.

One of them may be found in the coupling relationship between the transmission shaft (a shaft connecting the handle and the steering unit) and the steering unit. When the cabin is coupled to the transmission, the transmission shaft is mostly coupled to the steering unit in the state of being coupled to the cabin. Accordingly, the transmission shaft is designed to be detachably fitted into the steering unit via spline-coupling. This design has the advantages of improving the efficiency of the assembly of an agricultural tractor and reducing the transmission of noise and vibration to the cabin through the transmission shaft. However, referring to FIG. 3 of the conventional art, it can be seen that the steering unit is spaced apart from the bottom and also spaced apart from the cabin. In this case, it is obvious that the steering unit may not be firmly fixed to the cabin with only a buffer material. In that case, it is necessary to fix the transmission shaft to the steering unit or to provide a separate fixing means inside the buffer material, in which case the assembly efficiency of an agricultural tractor is reduced and also the efficiency of the reduction of noise and vibration coming to the cabin through the steering unit is significantly reduced.

SUMMARY

The present disclosure has been conceived from the consideration of a structure capable of maintaining assembly efficiency and a structure capable of minimizing design changes to existing structures while separating a cabin and a steering unit as much as possible in order to minimize vibration and noise coming through the steering unit.

According to a first aspect of the present disclosure, there is provided an agricultural tractor including: a power generator located in a power supply room, and configured to generate power, an advance/retreat device including drive wheels configured to generate advance/retreat force by rotating in conjunction with the operation of the power generator, and steer wheels configured to adjust an advance/retreat direction; a transmission configured to convert revolutions per minute based on the operation of the power generator and input a converted revolutions per minute to the drive wheels; a cabin disposed behind the power supply room and above the transmission, and configured to form a boarding space where a driver rides; and a steering system configured to adjust a traveling direction by controlling the steer wheels; wherein the steering system includes: a handle configured to be rotated and manipulated by the driver in the boarding space to control a direction of the steer wheels; a steering unit configured to contribute to changing the direction of the steer wheels by using the driver's rotational force applied to the handle; and a transmission unit configured to transmit the rotational force of the handle to the steering unit, and provided with a plurality of rotation shafts that are interconnected to each other, wherein one side of the transmission unit is coupled to the handle and an other side of the transmission unit is coupled to the steering unit; and wherein a coupling target to which the steering unit is coupled is located within the power supply room.

The plurality of rotation shafts include: a first rotation shaft coupled to the handle on one side thereof, and configured to rotate together with the handle; a second rotation shaft coupled to the steering unit on an other side thereof, and configured to rotate in conjunction with the rotation of the first rotation shaft; a third rotation shaft disposed between the first rotation shaft and the second rotation shaft, and configured to rotate in conjunction with the first rotation shaft and transmit the rotational force of the first rotation shaft to the second rotation shaft; a first universal joint configured to connect an other side of the first rotation shaft and one side of the third rotation shaft; and a second universal joint configured to connect one side of the second rotation shaft and an other side of the third rotation shaft.

At least one of a first angle formed by the first rotation shaft and a vertical line, a second angle formed by the second rotation shaft and a vertical line, and a third angle formed by the third rotation shaft and a vertical line has a different angle.

The coupling target is the power generator.

It may be considered preferable that the agricultural tractor according to the present disclosure further includes a mounting bracket configured to couple and install the steering unit to the coupling target and the mounting bracket has a form that secures a separation space so that the steering unit is coupled to the coupling target with a separation space therebetween.

The mounting bracket includes: a first coupling portion coupled to the coupling target; a second coupling portion formed to face the first coupling portion with the separation space interposed therebetween, and configured such that the steering unit is coupled thereto; and a separation portion configured to connect the first coupling portion and the second coupling portion so that they are spaced apart from each other.

The separation space may be located between the coupling target and the steering unit, and the second coupling portion and the separation portion may have an angle φ greater than 0 degrees and less than 90 degrees.

The second coupling portion and the separation portion have an angle greater than 90 degrees.

The steering unit may be disposed in the separation space.

The second coupling portion has a shaft through hole, and the transmission unit is coupled to the steering unit via the shaft through hole.

The mounting bracket may further include a guide portion configured to guide the steering unit and the transmission unit through coupling to each other.

The steering unit is spaced apart from the transmission.

According to the present disclosure, the following effects are achieved:

First, simple assembly is maintained between the cabin and the transmission and also the cabin may be as independent as possible from the vibration or noise caused by the operation of the power generator and the hydraulic pump, so that a comfortable driving environment is provided to a driver.

Second, the power supply room having a relatively large available space is utilized, so that design changes to other components can be minimized or prevented, thereby suppressing the increase in manufacturing cost attributable to the application of the present disclosure.

DETAILED DESCRIPTION

Preferred embodiments according to the present disclosure will be described with reference to the accompanying drawings. For the sake of brevity, descriptions of well-known components are omitted or abridged as much as possible.

First Embodiment

1. Description of Configuration

Figure 1:
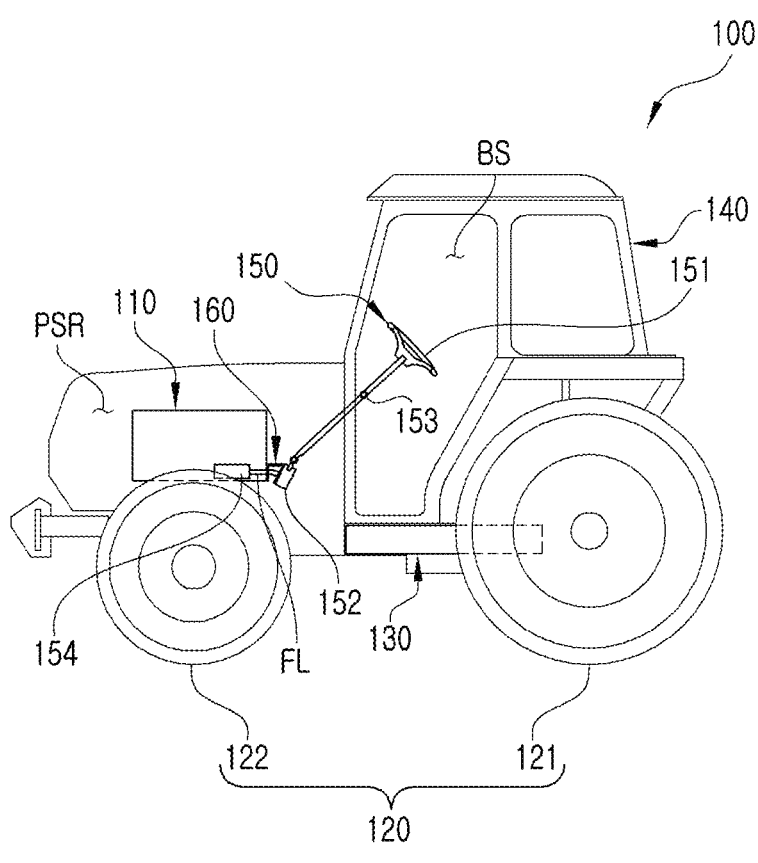
FIG. 1 is a schematic diagram of an agricultural tractor according to a first embodiment of the present disclosure.

FIG. 1 is a schematic diagram of an agricultural tractor 100 according to one embodiment of the present disclosure.

The agricultural tractor 100 according to the one embodiment of the present disclosure includes a power generator 110, an advance/retreat device 120, a transmission 130, a cabin 140, a steering system 150, and a mounting bracket 160.

The power generator 110 generates power for the operation of the agricultural tractor 100, and is located in a power supply room PSR.

The power generator 110 may be an internal combustion engine (a diesel engine, a gasoline engine, a bioenergy engine, or the like), and may further be provided as an electric motor.

The power supply room PSR is defined as a space that accommodates the power generator 110, and additionally accommodates a number of components, such as a cooling device (not shown), related to the power generator 110.

The advance/retreat device 120 generates advance/retreat force (forward/reverse force) in conjunction with the operation of the power generator 110. The advance/retreat unit 120 includes drive wheels 121 and steer wheels 122.

The drive wheels 121 are provided to rotate in conjunction with the operation of the power generator 110 to thus generate advance/retreat force for the agricultural tractor 100, and are usually arranged as rear wheels.

The steer wheels 122 are provided to adjust the advance/retreat direction of the agricultural tractor 100, and are usually arranged as front wheels. It is obvious that the steer wheels 122 may also be implemented to generate advance/retreat force.

The transmission 130 is provided to convert revolutions per minute (RPM) or a forward/reverse direction based on the operation of the power generator 110 and input a converted revolutions per minute to the drive wheels 121.

The cabin 140 is disposed behind the power supply room PSR and above the transmission 130.

The cabin 140 forms a boarding space BS in which a driver rides, and is coupled to the transmission 130.

The steering system 150 adjusts a traveling direction by controlling the steer wheels 122. To this end, the steering system 150 includes a handle 151, a steering unit 152, a transmission unit 153, a hydraulic pump 154, etc.

The handle 151 is rotated and manipulated by the driver in the boarding space BS to control the direction of the steer wheels 122.

The steering unit 152 converts the driver's rotational force, applied to the handle 151, into linear force, thereby contributing to a change in the direction of the steer wheels 122. That is, the steering unit 152 changes the direction of the steer wheels 122 by using the driver's rotational force applied to the handle 151. In this embodiment, the steering unit 152 is located in the power supply room PSR.

In the present embodiment, in addition to a rack and pinion structure for converting rotational force into linear force, the steering unit 152 is expected to have a power steering structure that adds hydraulic assistance force to the rotational force input from the driver. However, even when the steering unit 152 has or does not have another power steering structure for applying assistance force, it is not excluded from the present disclosure.

The transmission unit 153 transmits the rotational force of the handle 151 to the steering unit 152.

Figure 2:
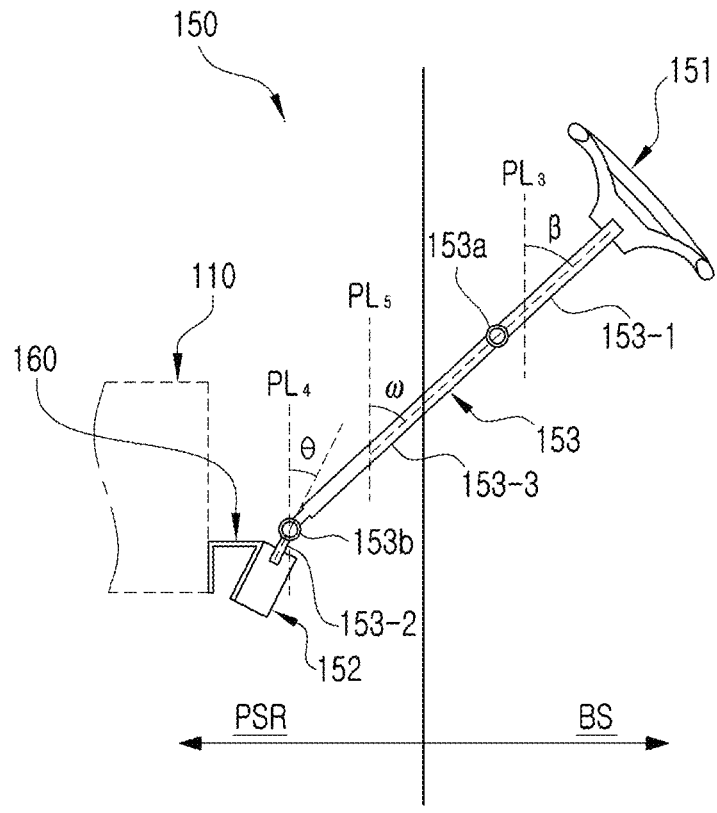
FIG. 2 is a conceptual enlarged excerpt view of the transmission unit of a steering system applied to the agricultural tractor of FIG. 1.

As shown in the conceptual enlarged excerpt view of FIG. 2, the transmission unit 153 in the present embodiment has three rotation shafts 153-1 to 153-3 and two universal joints 153a and 153b.

The first rotation shaft 153-1 is coupled to the handle 151 on one side (defined as the upper end part in the drawings, which is also the same below), and is rotated together with the handle 151 by the rotational force input from the driver to the handle 151.

The second rotation shaft 153-2 is detachably spline-coupled to the steering unit 152 on the other side (defined as the lower end part in the drawings, which is also the same below). The second rotation shaft 153-2 is rotated in conjunction with the rotation of the first rotation shaft 153-1. The second rotation shaft 153-2 is located in the power supply room PSR together with the steering unit 152.

The third rotation shaft 153-3 is disposed between the first rotation shaft 153-1 and the second rotation shaft 153-2. The third rotation shaft 153-3 transmits the rotational force of the first rotation shaft 153-1 to the second rotation shaft 153-2 while rotating in conjunction with the first rotation shaft 153-1. As in the present embodiment, it may be considered preferable that one side of the third rotation shaft 153-3 is disposed in the boarding space BS and the other side thereof is disposed in the power supply room PSR.

The first universal joint 153a connects the other side of the first rotation shaft 153-1 and one side of the third rotation shaft 153-3. The first universal joint 153a is disposed in the boarding space BS.

The second universal joint 153b connects one side of the second rotation shaft 153-2 and the other side of the third rotation shaft 153-3. The second universal joint 153b is disposed in the power supply room PSR.

The numbers of above rotation shafts 153-1 to 153-3 and universal joints 153a and 153b may be increased or decreased by taking into consideration the installation angle and length of the first rotation shaft 153-1 directly coupled to the handle 151, the installation location and angle of the steering unit 152, and/or the like. However, when viewed as a whole, one side of the transmission unit 153 is disposed in the boarding space BS, and the other side thereof is disposed in the power supply room PSR.

The hydraulic pump 154 supplies hydraulic pressure to the steering unit 153. The hydraulic pump 154 is provided in the power supply room PSR. Preferably, as in the present embodiment, it may be contemplated that the hydraulic pump 154 is fixedly attached to the power generator 110.

Figure 3:
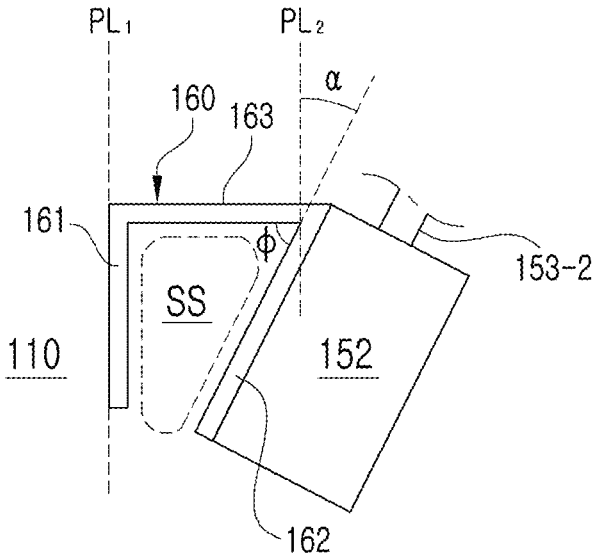
FIG. 3 is a conceptual enlarged excerpt view of a mounting bracket applied to the agricultural tractor of FIG. 1.

The mounting bracket 160 is provided to couple and install the steering unit 152 to the power generator 110. That is, the steering unit 152 is coupled to the power generator 110, which is a coupling target, by way of the mounting bracket 160. As shown in the conceptual enlarged excerpt view of FIG. 3, the mounting bracket 160 has an approximately inverted 'U' shape that is open downward when viewed from one side. When the mounting bracket 160 is further divided, the mounting bracket 160 may be divided into a first coupling portion 161, a second coupling portion 162, and a separation portion 163.

The first coupling portion 161 is coupled to the power generator 110.

The second coupling portion 162 is coupled to the steering unit 152. In other words, the steering unit 152 is coupled to the second coupling portion 162.

The separation portion 163 connects the first coupling portion 161 and the second coupling portion 162 while spacing the first coupling portion 161 and the second coupling portion 162 apart from each other, thereby allowing the steering unit 152 to be disposed somewhat apart from the power generator 110.

The reason why the steering unit 152 is installed to be coupled to the power generator 110 while being separated from the power generator 110 is to minimize the phenomenon in which noise and vibration generated from the power generator 110 are input to the steering unit 152. Accordingly, any shape may be applied to the mounting bracket 163 as long as it forms a separation space SS between the power generator 110 and the steering unit 152. That is, it is necessary for the mounting bracket 160 to be provided in a structure that secures the separation space SS so that the steering unit 152 can be coupled to the power generator 110 with a separation space therebetween.

Furthermore, when viewed from one side, the first coupling portion 161 is parallel to a vertical line $PL_1$, while the second coupling portion 162 has a predetermined angle $\alpha$ with respect to a vertical line $PL_2$. This is intended to allow the second rotation shaft 153-2 to be appropriately spline-coupled to the steering unit 152 by tilting the disposition angle of the steering unit 152. Accordingly, the second coupling portion 162 and the separation portion 163 may have an angle $\varphi$ greater than 0 degrees and less than 90 degrees. Meanwhile, even when the steering unit 152 is installed to be tilted as shown in FIG. 2, the axial direction of the first rotation shaft 153-1 may be different from the direction of coupling between the steering unit 152 and the second rotation shaft 153-2. More specifically, as in the present embodiment, a first angle $\beta$ formed by the first rotation shaft 153-1 and a vertical line $PL_3$ and a second angle $\theta$ formed by the second rotation shaft 153-2 and a vertical line $PL_4$ may be different from each other. Accordingly, it is necessary to provide the second universal joint 153b. That is, the second universal joint 153b improves the degree of freedom for the disposition angle of the steering unit 152, and thus helps to utilize an available space in the power supply room PSR. For example, when a third angle $\omega$ formed by the third rotation shaft 153-3 and a vertical line $PL_5$ is taken into consideration, any two of the first angle $\beta$, the second angle $\theta$, and the third angle $\omega$ may be the same, and only one angle may be different. Alternatively, the first angle $\beta$, the second angle $\theta$, and the third angle $\omega$ may all be different from one another. By changing the values of the first angle $\beta$, the second angle $\theta$, and the third angle $\omega$ as desired, a structure that makes it easy to assemble the cabin 140 may be obtained.

According to the above embodiment, it can be seen that the steering unit 152 is disposed outside the boarding space BS and is installed to be separated from the cabin 140 in the remaining area, excluding the area where it is spline-coupled with the transmission unit 153.

In addition, the steering unit 152 is separated from the transmission 130, so that no change in design of the transmission 130 is required.

2. Description of Assembly and Disassembly Processes

In the assembly process of coupling the cabin 140 to the transmission 130, the cabin 140 is coupled to the transmission 130 in the state in which the handle 151 and the transmission unit 153 have been assembled to the cabin 140. In this case, a worker fixedly couples the cabin 140 and the transmission 130 to each other after spline-coupling the other side of the second rotation shaft 153-2 to the steering unit 152.

In the disassembly process of separating the cabin 140 from the transmission 130, the cabin 140 and the transmission 130 are easily separated by releasing the fixation of the cabin 140 and the transmission 130 to each other and then lifting up the cabin 140. In this case, the other side of the second rotation shaft 153-2 detachably connected to the steering unit 152 is easily detached from the steering unit 152.

It is obvious that, according to the present disclosure, the process of coupling or separating the cabin 140 to or from the transmission 130 does not involve the separate connection and disconnection of a hydraulic line FL.

3. Description of Vibration and Noise during Operation

According to the above embodiment, the steering unit 152 is located in the power supply room PSR in the state of being spatially separated from the cabin 140. Accordingly, the hydraulic pump 154 and the hydraulic line FL are also located in the power supply room PSR. Additionally, the steering unit 152 is mechanically separated from the cabin 140 in the remaining area, excluding the area where it is spline-coupled with the transmission unit 153. Furthermore, the steering unit 152 is coupled and installed to the power generator 110 by the mounting bracket 160 that forms a separation space SS.

Accordingly, the vibration and noise generated from the power generator 110 are attenuated in the mounting bracket 160. Furthermore, the vibration and noise of the power generator 110 reduced in the mounting bracket 160 and the vibration and noise of the power generator 110 and the hydraulic pump 154 coming through the hydraulic line FL are attenuated again in the spline-coupling structure between the steering unit 152 and the second rotation shaft 153-2. Furthermore, the steering unit 152 is mechanically separated from the cabin 140 in the remaining area, excluding the area where it is coupled to the transmission unit 153, so that vibration and noise are not input to the boarding space BS via other points. Additionally, this provides a driver with a considerable degree of comfort free from vibration and noise.

Second Embodiment

The general configuration of an agricultural tractor 100 according to a second embodiment of the present disclosure is the same as that of the first embodiment. Accordingly, in the second embodiment, a description of the general configuration is replaced with a description of that of the first embodiment.

However, the second embodiment differs from the first embodiment in terms of the shape of the mounting bracket 160 and the coupling and arrangement of the mounting bracket 160 and the steering unit 152. This will be described additionally.

Figure 4:
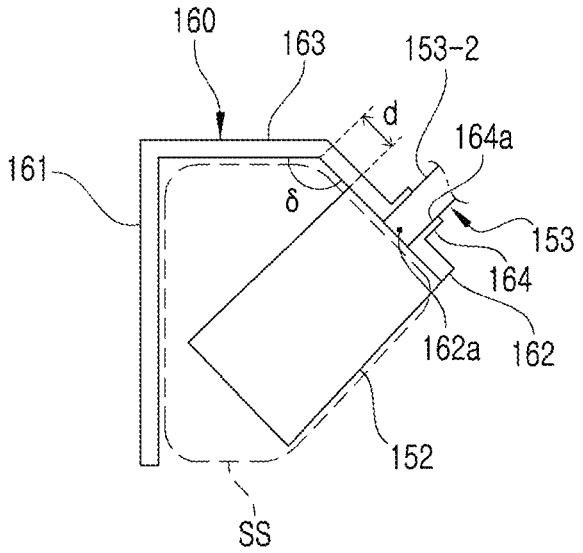
FIGS. 4 to 6 are schematic reference diagrams illustrating main parts of an agricultural tractor according to a second embodiment of the present disclosure.

FIG. 4 is a conceptual excerpt view of main parts of the agricultural tractor 100 according to the second embodiment.

A mounting bracket 160 in the second embodiment may be divided into a first coupling portion 161, a second coupling portion 162, a separation portion 163, and a guide portion 164.

The first coupling portion 161 is coupled to a power generator 110. Furthermore, the first coupling portion 161 may be coupled to another coupling target other than the power generator 110 in a power supply room PSR. It is obvious that it is not necessary to interpret the mounting bracket 160 in the second embodiment as being limited to coupling a steering unit 152 to a coupling target in the power supply room PSR.

The second coupling portion 162 is coupled to the steering unit 152. This second coupling portion 162 has a shaft through hole 162a.

The transmission unit 153 may be coupled with the steering unit 152 via the shaft through hole 162a. More specifically, the second rotation shaft 153-2 of the transmission unit 153 may pass through the shaft through hole 162a. Accordingly, the second rotation shaft 153-2 may pass through the shaft through hole 162a and be spline-coupled with the steering unit 152.

In the second embodiment, a separation space SS is also formed between the first coupling portion 161 and the second coupling portion 162.

The separation portion 163 connects the first coupling portion 161 and the second coupling portion 162 so that they are spaced apart from each other.

According to the present embodiment, the separation space SS becomes wider in the downward direction. Accordingly, unlike in the first embodiment, in the second embodiment, an angle $\delta$ formed by the second coupling portion 162 and the separation portion 163 is an obtuse angle greater than 90 degrees. In other words, one surface of the second coupling portion 162 is implemented such that it faces the handle 151. In this case, the one surface is the surface opposite to the surface that faces the separation space SS.

The guide portion 164 is provided to guide the steering unit 152 and the transmission unit 153 through coupling to each other.

The guide portion 164 is formed to protrude from the one surface of the second coupling portion 162 toward the handle 151.

The guide portion 164 is implemented as a cylindrical shape having a guide hole 164*a*. Furthermore, the guide hole 164*a* is disposed on the same line as the shaft through hole 162*a*. Accordingly, an assembly worker may more easily spline-couple the steering unit 152 and the transmission unit 153 by inserting the lower end part of the transmission unit 153 into the guide hole 164*a* of the protruding guide portion 164. More specifically, the assembly worker may easily spline-couple the steering unit 152 and the transmission unit 153 by inserting the end (the lower end) of the second rotation shaft 153-2 of the transmission unit 153 into the guide hole 164*a*.

It is obvious that the guide portion 164 may be formed to have any shape as long as it can guide the steering unit 152 and the transmission unit 153 through coupling to each other.

When the second embodiment described above is adopted, there are the following additional advantages:

First, the separation space SS may be utilized as a space where the steering unit 152 is installed. Accordingly, the space for installing the steering unit 152 may be reduced, and the design of the space becomes easier to that extent.

Figure 5:
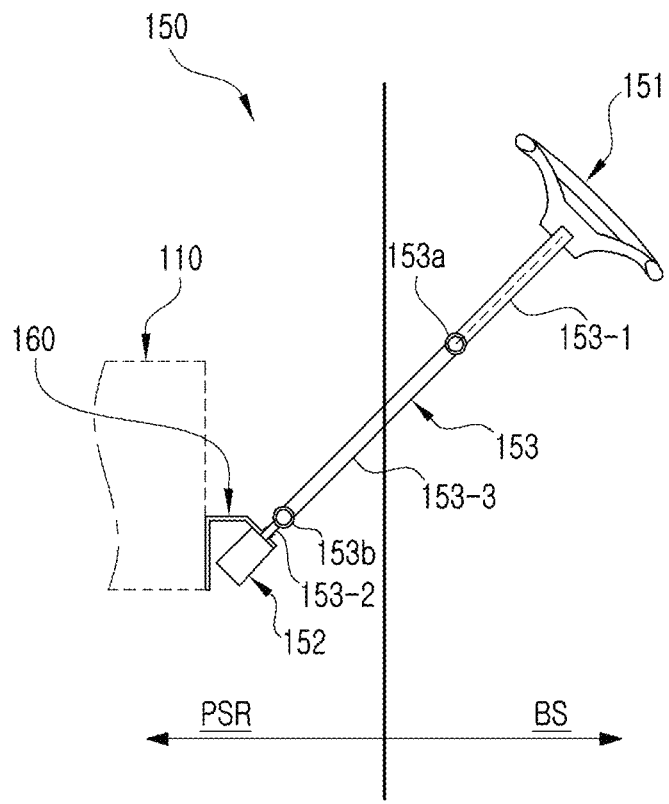

Second, as shown in FIG. 5, the first rotation shaft 153-1, the second rotation shaft 153-2, and the third rotation shaft 153-3 may be arranged on a single straight line to be as close to each other as possible.

Figure 6:
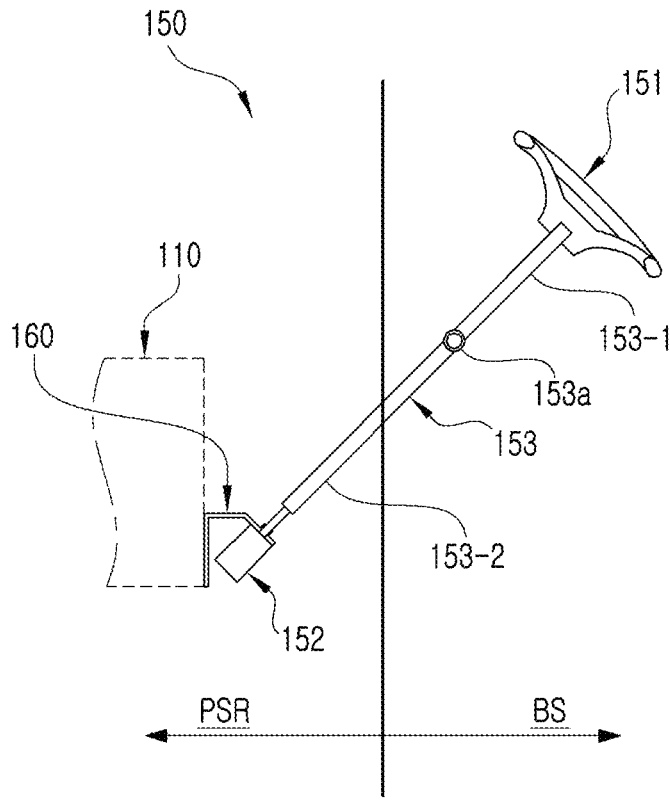

This arrangement may enable the omission of either the first universal joint 153*a* or the second universal joint 153*b*, as shown in the reference view of FIG. 6. In other words, the third rotation shaft 153-3 may be omitted. Accordingly, the manufacturing cost of the transmission unit 153 may be reduced to that extent.

Furthermore, when the cabin 140 is installed to the transmission 130, the spline-coupling of the transmission unit 153 and the steering unit 152 may be more easily achieved, thereby improving manufacturability.

Third, the steering unit 152 may be disposed to be spaced apart from the separation portion 163 by a predetermined distance d. This disposition may further reduce the vibration impact of the power generator 110 that may be input to the steering unit 152. Accordingly, a more comfortable environment in the boarding space BS may be constructed to that extent.

Fourth, the steering unit 152 is disposed in the separation space SS, so that the mounting bracket 160 protects the steering unit 152 from external interfering objects.

Meanwhile, in the above embodiment, the steering unit 152 is installed and coupled to the power generator 110 by the mounting bracket 160. However, by taking into consideration the location of an available space in the power supply room PSR, the mounting bracket 160 may be provided to couple and install the steering unit 152 to a coupling target other than the power generator 110 (e.g., a support frame supporting the power generator, a support frame supporting a hood, a hood cover, or the like). That is, by taking into consideration the fact that it is necessary not to require design changes to other components or to minimize them as much as possible, a coupling target to which the steering unit 152 is coupled may be selected.

The above-described embodiments have been descried only based on preferred examples of the present disclosure, and may have various application forms. Accordingly, the present disclosure should not be understood as being limited to the contents described above. Instead, the scope of the rights of the present disclosure should be understood as the separately described claims and their equivalents.

The invention claimed is:

1. An agricultural tractor comprising:

a power generator located in a power supply room, and configured to generate power;

an advance/retreat device including drive wheels configured to generate advance/retreat force by rotating in conjunction with operation of the power generator, and steer wheels configured to adjust an advance/retreat direction;

a transmission configured to convert revolutions per minute based on the operation of the power generator and input a converted revolutions per minute to the drive wheels;

a cabin disposed behind the power supply room and above the transmission, and configured to form a boarding space where a driver rides; and a steering system configured to adjust a traveling direction by controlling the steer wheels;

wherein the steering system comprises:

a handle configured to be rotated and manipulated by the driver in the boarding space to control a direction of the steer wheels;

a steering unit configured to contribute to changing the direction of the steer wheels by using the driver's rotational force applied to the handle; and a transmission unit configured to transmit rotational force of the handle to the steering unit, and provided with a plurality of rotation shafts that are interconnected to each other;

wherein one side of the transmission unit is coupled to the handle and an other side of the transmission unit is coupled to the steering unit; and wherein a coupling target to which the steering unit is coupled is located within the power supply room;

wherein the coupling target is the power generator, wherein the agricultural tractor further comprises a mounting bracket configured to couple and install the steering unit to the power generator, and wherein the steering unit is spaced apart from the transmission while being coupled to the power generator via the mounting bracket.

2. The agricultural tractor of claim 1, wherein the plurality of rotation shafts comprise:

a first rotation shaft coupled to the handle on one side thereof, and configured to rotate together with the handle;

a second rotation shaft coupled to the steering unit on an other side thereof, and configured to rotate in conjunction with rotation of the first rotation shaft;

a third rotation shaft disposed between the first rotation shaft and the second rotation shaft, and configured to rotate in conjunction with the first rotation shaft and transmit rotational force of the first rotation shaft to the second rotation shaft;

a first universal joint configured to connect an other side of the first rotation shaft and one side of the third rotation shaft; and a second universal joint configured to connect one side of the second rotation shaft and an other side of the third rotation shaft.

3. The agricultural tractor of claim 2, wherein at least one of a first angle formed by the first rotation shaft and a vertical line, a second angle formed by the second rotation shaft and a vertical line, and a third angle formed by the third rotation shaft and a vertical line has a different angle.

4. The agricultural tractor of claim 1, wherein the mounting bracket has a form that secures a separation space so that the steering unit is coupled to the power generator with a separation space therebetween.

5. The agricultural tractor of claim 4, wherein the mounting bracket comprises:

a first coupling portion coupled to the power generator;

a second coupling portion formed to face the first coupling portion with the separation space interposed therebetween, and configured such that the steering unit is coupled thereto; and a separation portion configured to connect the first coupling portion and the second coupling portion so that they are spaced apart from each other.

6. The agricultural tractor of claim 5, wherein:

the separation space is located between the power generator and the steering unit; and the second coupling portion and the separation portion have an angle greater than 0 degrees and less than 90 degrees.

7. The agricultural tractor of claim 5, wherein the second coupling portion and the separation portion have an angle greater than 90 degrees.

8. The agricultural tractor of claim 4, wherein the steering unit is disposed in the separation space.

9. The agricultural tractor of claim 8, wherein:

the second coupling portion has a shaft through hole; and the transmission unit is coupled to the steering unit via the shaft through hole.

10. The agricultural tractor of claim 8, wherein the mounting bracket further comprises a guide portion configured to guide the steering unit and the transmission unit through coupling to each other.

11. The agricultural tractor of claim 5, wherein the mounting bracket has an approximately inverted "U" shape that is open downward when viewed from one side.

\*   \*   \*   \*   \*